May 10, 1938.　　　　P. CROSTI　　　　2,117,152

PIPE JOINT

Filed June 26, 1936

P. Crosti
INVENTOR

By: Glascock Downing Seabold
Attys.

Patented May 10, 1938

2,117,152

UNITED STATES PATENT OFFICE 2,117,152

PIPE JOINT

Pietro Crosti, Milan, Italy

Application June 26, 1936, Serial No. 87,554
In Italy June 26, 1935

5 Claims. (Cl. 285—91)

The installation on locomotives of steam generators in connection with feedwater heaters in order to secure a better utilization of the combustion gases has always met with great difficulties, especially when the steam generators and the feedwater heaters are of considerable size and must therefore be separately installed on two different cars or on locomotive parts that are not interconnected in such a manner as to form a rigid system.

The combustion gases that must pass from the steam generator to the waterheater as mentioned, generally have a temperature which is still high and of the order of 400–460° C. It is readily seen that it is not easy to design a piping which, notwithstanding the mutual displacements of the two elements of the boiler, is sufficiently tight and capable of withstanding the high temperature, without necessitating complicated lubrication arrangements between the movable jointing surfaces which are liable to friction, because the lubrication is difficult to obtain just in consequence of the high temperature.

The problem is solved:

(a) By reducing to a minimum the extension of the conducting surfaces subjected to relative movements;

(b) By forming, with the said surfaces, a set of compartments separate from one another so as to subdivide the pressure drop between the inside and the outside of the piping, thus breaking the force that determines the leakage of air and gas through the insufficiently tight contacting surfaces;

(c) By forming, with the said compartments, a sure distribution of the temperature gradient of the leakage gases so as to reduce to a minimum the disturbance of the thermal conditions of the system and not to bring about considerable losses;

(d) By making provisions to the effect that the contacting surfaces less exposed to the gas temperature may be utilized in order to improve the tightness, as well as to the effect that the said surfaces may be lubricated and enabled to better withstand the weight of the suspended elements.

The invention illustrated by way of example in the accompanying drawing just possesses all the said requirements and represents a novelty in the structure and arrangement of its parts.

It is obvious that, in order that the combustion gases may pass from the furnace 1 to the chimney 2, it is necessary that the piping 3 be preserved tight, especially in the jointings 4 and 5 in spite of the mutual displacement of the boiler elements A and B.

It is also obvious that the arrangement must be capable to work, no matter whether the gases are drawn into 2 by suction or are forced into 2 by a greater pressure existing in 1. In the former case, a lower pressure than the outside pressure will exist in the piping 3 and there will be a tendency to the inrush of air from the outside into the piping through untight spots. In the latter case, the pressure inside the piping 3 will be greater than the external pressure and the tendency will be for the gases to leak to the outside through possible untight spots. The angle between the main sections of the two joints does not matter and may have any value between 0° and 90° according to the position of the elements A and B as well as according to the convenience of a more or less easy erection for inspection and removal of the elements A and B.

The spherical surfaces and the cylindrical surfaces may be provided either on the piping or on the stationary part of the elements A and B according to considerations that do not affect the invention.

Figure 1:
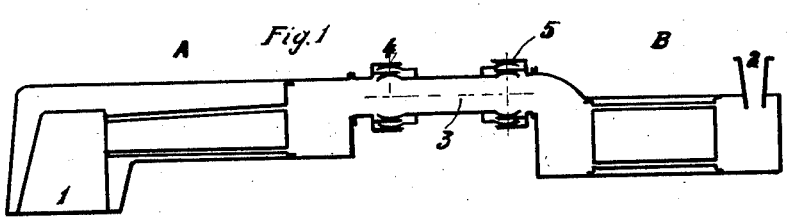
Fig. 1 shows a general arrangement, indicated only by way of example, of a piping flexibly arranged between two elements A and B of a locomotive steam boiler divided into two parts which may be installed either on two separate vehicles or on a single vehicle of non-rigid structure so that the said elements A and B may shift their mutual position.
Figures 2, 3:
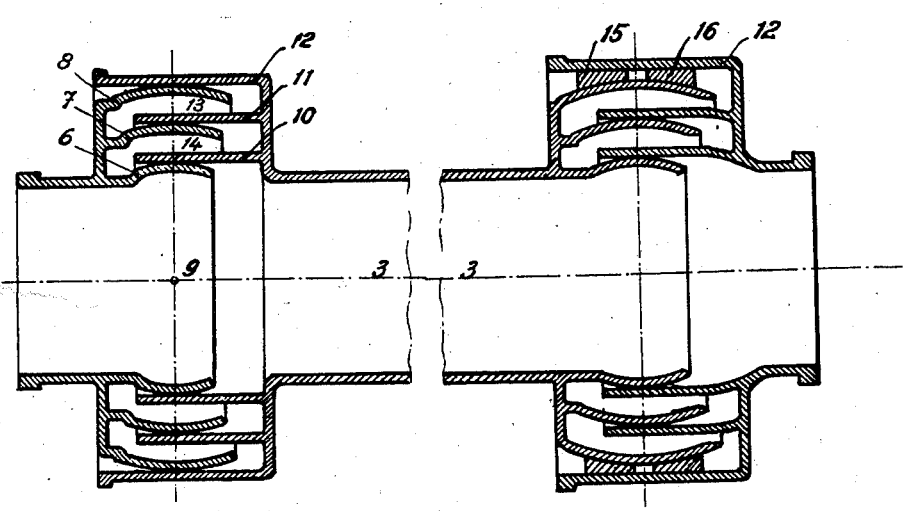
Figs. 2 and 3 show to a larger scale two types of an articulation of the flexible pipings.

Fig. 2 shows to a larger scale one of the said joints built up of three sets of spherical and cylindrical surfaces. The three spherical surfaces 6, 7, 8 have a common center at 9 and can therefore all of them be simultaneously touched along their maximum circle by the three cylindrical surfaces 10, 11, 12, these latter surfaces being coaxial between them and their diameter being equal to that of the respective inscribed spheres, even if the cylindrical surfaces revolve about the center 9 and their common axis is displaced while always passing through the center 9.

It follows that, consistently with the dimensions adopted for the single elements, the piping 3 can receive a different orientation and be displaced without the contact between the cylindrical and the spherical surfaces being destroyed.

In this manner, along the resulting contact lines the closure is formed which is aimed at by the invention and which opposes itself to the passage of the gas from the inside to the outside of the piping and conversely according to whether a higher or lower pressure exists. In order that this passage may take place it is further necessary, in the case of Fig. 2, that the fluid shall overcome the three successive resistances of the three contact surfaces. The pressure difference between the inside and the outside, in function of which the passage is determined, is thus divided into three and, except for the favorable intervention of other important phenomena, the possible loss will be reduced to the loss that is determined by a pressure difference equal to ⅓ of the difference actually existing between the inside and the outside.

Proportional consequences will be achieved in the case that a different number of pairs of contact surfaces is adopted.

However, the intervention of important phenomena gives a greater value to the invention. In the case that the pressure existing in the piping be less than the external pressure, the cold air which has succeeded in leaking through the contact of the surface pairs will increase in volume in the ratio of 1/273° C. for each degree of greater temperature existing in the compartment 13 and afterwards in the compartment 14.

Through this fact the airweight that can leak is considerably reduced, to the advantage of the thermal balance sheet of the system.

The pair of contacting surfaces 8 and 12 having a greater diameter and being farthest away from the passage of the gases will possess a very limited temperature as compared with the temperature of the combustion gases; it is therefore practicable to line either one or both surfaces with partially elastic matter or tissues, thus improving the tightness conditions and enabling the lubrication of said surfaces.

In the case that the contacting surface and therewith the bearing surface of the outer pair should be increased owing, for instance, to the considerable weight of the piping, and in the case that it be desired to secure the greatest hermeticity, one or more rings 15 and 16 may be arranged around the spherical surface, as shown on Fig. 3. The said rings, the internal surface of which accurately matches the spherical surface of the joint, have an external cylindrical surface accurately matching the internal surface of the last cylindrical surface 12 of the joint.

Owing to the fact that the spherical surfaces are concentrical and the cylindrical surfaces are coaxial, the piping 3 can change its orientation relatively to the stationary parts and can move nearer to or away from said stationary parts.

Where desired, the surfaces of the two sets in contact may be of different nature from those described, provided they fulfill the object in view such as it results from the appended claims.

Having now particularly described and ascertained the nature of my said invention and in what manner the same is to be performed, I declare that what I claim is:—

1. Flexible piping elements for the conveyance of combustion gases from one boiler unit to another, comprising a plurality of cup-shaped members having concentric outer spherical surfaces forming the contact end of one piping element, and other cup-shaped members having concentric inner cylindrical surfaces circumscribing said first surfaces and forming the contact end of the other piping element, said contacting spherical and cylindrical surfaces forming a sealing connection between said members while permitting longitudinal and lateral movements of said piping elements.

2. A flexible piping connection of the character described comprising in combination, a pipe member having a plurality of cup-shaped end members, and another cooperating pipe member having ball-shaped end members adapted to slidably engage said other cup-shaped members, a seat for one of said ball-shaped end members, said seat being slidable in one of the cup-shaped end members.

3. A flexible piping connection of the character described comprising in combination, a pair of pipe members having a plurality of interfitting end members provided with cooperating bearing surfaces forming a fluid tight ball joint, and said members being formed to permit telescopic movement of said members without breaking the fluid tight relationship of the members comprising the joint.

4. In combination with a flexible piping connection as set forth in claim 3, comprising in combination therewith, a pair of ring shaped members constituting a swivel seat with one of said interfitting end members of one pipe member and slidably engageable with the cooperating interfitting end member of the other pipe member, said ring-shaped members effecting sealing engagement between said interfitting end members.

5. A flexible piping connection of the character described comprising in combination, a pair of pipe members having a plurality of telescopic interfitting end members provided with cooperating bearing surfaces forming a fluid tight universal joint, one of the pipe end members of said joint comprising a plurality of nested spherical-shaped cup members having concentric outer surfaces, and the other pipe end member forming the joint comprising a plurality of nested cylindrical cup-shaped members having concentric inner surfaces engageable with the outer surfaces of the spherical-shaped cup members.

PIETRO CROSTI.